US008671346B2

(12) United States Patent (10) Patent No.: US 8,671,346 B2
Hua et al. (45) Date of Patent: Mar. 11, 2014

(54) SMART VIDEO THUMBNAIL

(75) Inventors: Xian-Sheng Hua, Beijing (CN); Fei Wang, Beijing (CN); Zhike Kong, Beijing (CN); Shipeng Li, Sammamish, WA (US); Waiman Lam, Sammamish, WA (US); Zach Johnson, Woodinville, WA (US); Mark Young, Redmond, WA (US); Aaron DeYonker, San Francisco, CA (US); Mark Schwesinger, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1657 days.

(21) Appl. No.: 11/704,543

(22) Filed: Feb. 9, 2007

(65) Prior Publication Data

US 2008/0192840 A1 Aug. 14, 2008

(51) Int. Cl.
*G06F 3/048* (2013.01)
*G06F 3/00* (2006.01)
*G06F 13/00* (2006.01)
*G06F 3/12* (2006.01)
*G06K 9/00* (2006.01)

(52) U.S. Cl.
USPC ........... 715/723; 715/725; 715/719; 715/716; 725/37; 725/38; 725/41; 725/52

(58) Field of Classification Search
USPC ........ 715/725, 723, 719, 716; 725/37, 38, 41, 725/52
See application file for complete search history.

(56) References Cited

U.S. PATENT DOCUMENTS

| 5,903,892 | A * | 5/1999 | Hoffert et al. ................. 715/716 |
| 5,956,026 | A * | 9/1999 | Ratakonda .................... 715/723 |
| 6,222,532 | B1 * | 4/2001 | Ceccarelli ..................... 715/723 |
| 6,469,749 | B1 * | 10/2002 | Dimitrova et al. ............ 348/722 |
| 6,553,180 | B1 | 4/2003 | Kikuchi et al. |
| 6,920,610 | B1 | 7/2005 | Lawton et al. |
| 6,996,782 | B2 | 2/2006 | Parker et al. |
| 7,212,666 | B2 | 5/2007 | Zhang et al. |
| 7,630,613 | B2 * | 12/2009 | Murabayashi et al. ......... 386/69 |
| 8,402,492 | B2 * | 3/2013 | Amira et al. .................... 725/61 |
| 2001/0033736 | A1 | 10/2001 | Yap et al. |
| 2002/0133486 | A1 | 9/2002 | Yanagihara et al. |
| 2002/0166122 | A1 * | 11/2002 | Kikinis et al. ................. 725/56 |
| 2003/0126598 | A1 * | 7/2003 | Agnihotri et al. .............. 725/32 |

(Continued)

FOREIGN PATENT DOCUMENTS

WO WO2005101415 A1 10/2005

OTHER PUBLICATIONS

Chen Mei, "Video Mining for Creative Rendering", Date Aug. 2005, http://www.enformatika.org/data/v7/v7-17.pdf.

(Continued)

*Primary Examiner* — Jordany Nunez
(74) *Attorney, Agent, or Firm* — Micah Goldsmith; Glen Johnson; Micky Minhas (57) ABSTRACT

Described herein is technology for, among other things, selecting a representative thumbnail from a video clip. The technology involves analyzing frames of the video clip to determine which frames are stable, the result of the analysis being a number of segments of stable frames. From the stable segments, a number of candidate segments are selected, where candidate segments are those segments determined to a degree of certainty to be program content. The representative thumbnail is then selected from among the frames of the candidate segments.

21 Claims, 5 Drawing Sheets

(56) References Cited

U.S. PATENT DOCUMENTS

| | | | |
|---|---|---|---|
| 2003/0137546 A1 | 7/2003 | Suh et al. | |
| 2004/0027393 A1 | 2/2004 | Kato et al. | |
| 2004/0095396 A1 | 5/2004 | Stavely et al. | |
| 2004/0197071 A1* | 10/2004 | Zhang et al. | 386/46 |
| 2005/0058434 A1 | 3/2005 | Nakashika et al. | |
| 2005/0125828 A1 | 6/2005 | Fujiwara et al. | |
| 2005/0149557 A1 | 7/2005 | Moriya et al. | |
| 2005/0180580 A1 | 8/2005 | Murabayashi et al. | |
| 2005/0232598 A1 | 10/2005 | Kawauchi | |
| 2006/0026524 A1* | 2/2006 | Ma et al. | 715/713 |
| 2006/0090141 A1* | 4/2006 | Loui et al. | 715/764 |
| 2006/0095262 A1 | 5/2006 | Danieli | |
| 2006/0107289 A1 | 5/2006 | DeYonker et al. | |
| 2006/0158682 A1 | 7/2006 | Atsumi et al. | |
| 2006/0210253 A1 | 9/2006 | Bak et al. | |
| 2006/0228029 A1 | 10/2006 | Zhang et al. | |
| 2006/0250713 A1 | 11/2006 | Yoo et al. | |
| 2007/0041707 A1 | 2/2007 | Edmunds et al. | |
| 2007/0242926 A1* | 10/2007 | Huang et al. | 386/52 |
| 2007/0296863 A1 | 12/2007 | Hwang et al. | |
| 2009/0073266 A1* | 3/2009 | Abdellaziz Trimeche et al. | 348/180 |
| 2009/0158157 A1 | 6/2009 | Shields et al. | |

OTHER PUBLICATIONS

Chai, et al., "Structural Analysis of Musical Signals for Indexing and Thumbnailing", Date: 2003, pp. 27-34, http://delivery.acm.org/10.1145/830000/827144/p27-chai.pdf?key1=827144&key2=5279835611&coll=GUIDE&dl=ACM&CFID=11111111&CFTOKEN=2222222.

Shao, et al., "Automatic Summarization of Music Videos", Date: May 2006, pp. 127-148, vol. 2, Issue: 2, ACM Press, New York, USA, http://delivery.acm.org/10.1145/1150000/1142023/p127-shao.pdf?key1=1142023&key2=6939835611&coll=GUIDE&dl=ACM&CFID=11111111&CFTOKEN=2222222.

Sengupta, et al., "Semantic Thumbnails a Novel Method for Summarizing Document Collections", Date: 2004, pp. 45-51, ACM Press, New York, USA, http://delivery.acm.org/10.1145/1030000/1026547/p45-sengupta.pdf?key1=1026547&key2=4998835611&coll=GUIDE&dl=ACM&CFID=11111111&CFTOKEN=2222222.

Office Action from the United States Patent Office regarding U.S. Appl. No. 11/956,702 dated Oct. 13, 2010.

Office Action from the United States Patent Office regarding U.S. Appl. No. 11/956,702 dated Mar. 15, 2011.

Office Action from the United States Patent Office regarding U.S. Appl. No. 11/956,702 dated Jan. 30, 2012.

Office Action from the United States Patent Office regarding U.S. Appl. No. 11/956,702 dated Jul. 24, 2012.

"Panasonic Intros New OIGA OVR", Published May 28, 2004, retrieved from <<http://www.dvd-recordable.org/Article1328-mode=thread-order0-threshold0.phtml>> on May 24, 2007.

"Stream Pix Software: Digital video recording solution", retrieved from <<http://www.norpix.com/products/streampix.php>> on May 24, 2007.

"Sony SVR-S500-Digital Video Recorder (DVR) with 80GB Hard Drive and Freeview", retrieved from <<http://www.amazon.co.uk/Sony-SVR-S500-Digital-Recorder-Freeview/dp/tech-data/B000FCQMFK>> on May 24, 2007.

Vellacott, "DVR vs NVR—Digital Video Recording for Enterprise Systems", retrieved from <<http://www.indigovision.com/feature%20articles/IndigoVision%20USA%20Article%20DVR%20vs%20NVR.pdf>> on May 24, 2007.

* cited by examiner

SMART VIDEO THUMBNAIL

BACKGROUND

In recent years, the number of personal video recorders (PVRs), such as set-top digital video recorders (DVRs) and media center PCs, in homes has increased considerably. Generally speaking, a conventional PVR is a device that records video without a videotape to a hard drive-based digital storage media. This makes the "timeshifting" feature (more traditionally done by a VCR) much more convenient, and also allows for other features such as pausing live TV, instant replay of interesting scenes, chasing playback where a recording can be viewed before has been completed, skipping advertising, and the like.

In conventional PVRS, recorded programs are typically accessed through a textual list. In some cases, recordings are identified by their names and descriptions. Additionally, recordings may also be identified by the title of the specific episode and the date of the airing. In some cases, these identifiers may be insufficient to signal to a user the contents of a particular recording. In other cases, the identifiers may take more time to read than it would take to recognize the program visually. In other words, conventional PVRs do not provide graphical clues as to the contents of recordings.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, selecting a representative thumbnail from a video clip. The technology involves analyzing frames of the video clip to determine which frames are stable, the end result of the analysis being a number of segments of stable frames. From the stable segments, a number of candidate segments are selected, where candidate segments are those segments determined to a degree of certainty to be program content. The representative thumbnail is then selected from among the frames of the candidate segments.

Thus, embodiments allow for a smart video thumbnail to be selected from a video or a video clip to represent the corresponding video. Embodiments provide technology to help insure that the selected thumbnail is program content, good visual quality, and highly representative of the video. This greatly enhances the user experience relative to conventional PVRs. As result of the present technology, a visual cue is provided to aid the user in identifying a recorder program with greater certainty.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

OVERVIEW

As outlined above, conventional PVRs do not provide a graphical indicator, such as a thumbnail, to aid a user in identifying a recorded program. Described herein is technology for, among other things, selecting a representative thumbnail from a video clip. The thumbnail cannot simply be selected at random, because program content versus non-program content need to be distinguished. Non-program content includes, for instance, commercials, credit sequences, blurry frames, black frames, etc. Other factors such as padding time at the beginning and/or end of a recording also need to be considered. Consequently, the technology involves analyzing frames of the video clip to determine which frames are stable, the end result of the analysis being a number of segments of stable frames. From the stable segments, a number of candidate segments are selected, where candidate segments are those segments determined to a degree of certainty to be program content. The representative thumbnail is then selected from among the frames of the candidate segments.

The following discussion will begin with a description of an example operating environment for various embodiments. Discussion will proceed to a description of the structure of a smart thumbnail selection system 200. Discussion will then proceed to descriptions of implementation of example methods for selecting smart thumbnails.

EXAMPLE OPERATING ENVIRONMENT

Figure 1:
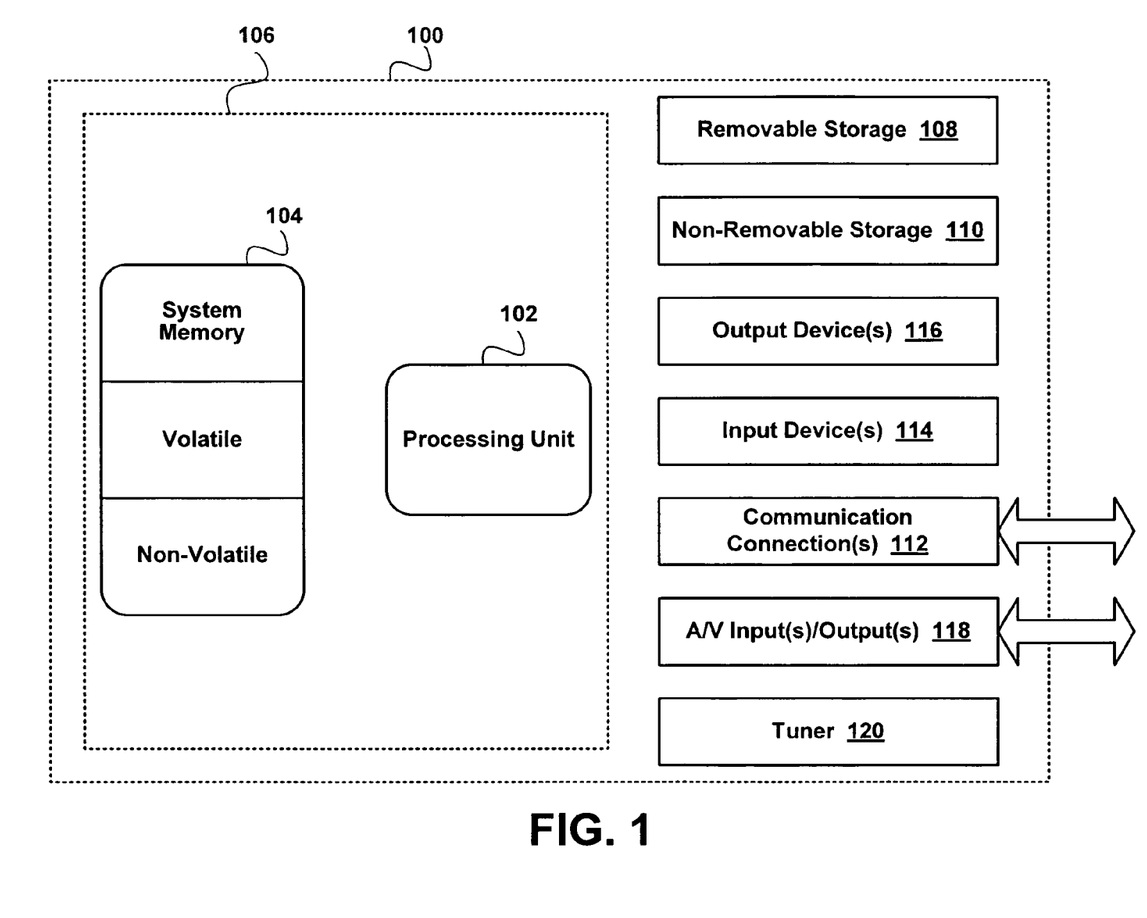
FIG. 1 is a block diagram of an exemplary computing system environment for implementing embodiments.

With reference to FIG. 1, an exemplary system for implementing embodiments includes a general purpose computing system environment, such as computing system environment 100. In various embodiments, the computing system environment 100 may be a personal video recorder (PVR) such as a standalone PVR, a PVR integrated into a set-top box, a media center PC, and the like. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106. Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 100 may also have input device(s) 114 such as a keyboard, mouse, pen, voice input device, touch input device, remote control input device, etc. Output device(s) 116 such as a display, speakers, printer, etc. may also be included. All these devices are well known in the art and need not be discussed at length here.

The computing system environment 100 may also include a number of audio/video inputs and outputs 118 for receiving and transmitting video content. These inputs and outputs may include, but are not limited to, coaxial, composite video, S-video, HDMI, DVI, VGA, component video, optical, and the like. It should be appreciated that since video content may be delivered over an Internet connection, a network interface may therefore also be considered an A/V input on which video content is received. In addition, the computing system environment 100 may also include a tuner 120 for selecting specific channels for receiving video content. The tuner 120 may be coupleable with a cable card (not shown) in order to enable the tuning of certain digital channels.

Embodiments are described in terms of these example environments. Description in these terms is provided for convenience only. It is not intended that the embodiments be limited to application in this example environment. In fact, after reading the following description, it will become apparent to a person skilled in the relevant art how to implement alternative embodiments.

EXAMPLE THUMBNAIL SELECTION SYSTEM

Figure 2:
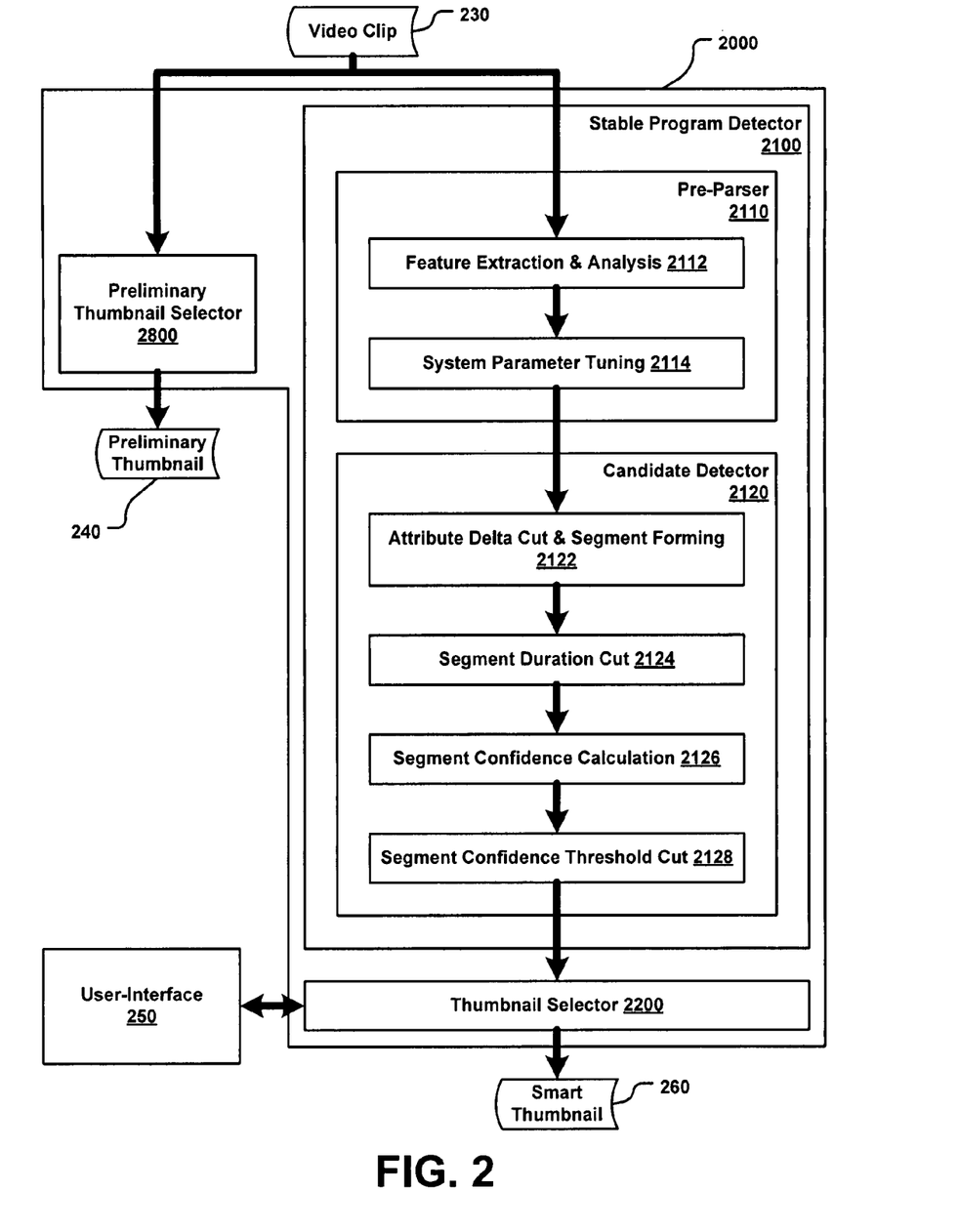
FIG. 2 illustrates a block diagram of a system for selecting a smart thumbnail from a video clip, in accordance with various embodiments.

FIG. 2 illustrates a block diagram of a system 2000 for selecting a smart thumbnail 260 from a video clip 230, in accordance with various embodiments. In one embodiment, the video clip 230 is a recording of a television program on a PVR. The video clip 230 may be a number of different formats including, but not limited to, MPEG, AVI, and WMV. System 2000 includes a stable program detector 2100 that is operable to determine one or more candidate segments from the video clip 230. As used herein, candidate segments refer to segments of the video clip 230 that are determined to degree of certainty to be program segments. In addition, the candidate segments are also relatively more "stable" than other segments. This special property guarantees that a thumbnail selected from these candidate segments has good visual quality and also has a high probability to be program content, the reason being that the more stable of frame is, the better the quality will be. Moreover, program parts of a video clip 230 tend to be more stable than non-program parts as well. A smart thumbnail 260 is then selected from these candidate segments by a thumbnail selector 2200 (discussed in greater detail below).

The stable program detector 2100 includes a pre-parser 2110, which is operable to analyze frames of the video clip 230 to determine which frames are stable. In other words, the frames of the video clip 230 are determined to be either stable or non-stable. A stable frame is a frame that exhibits a low degree of movement and/or change with respect to the preceding and following frames. The resulting stable frames make up a plurality of stable segments (i.e., one or more stable frames in sequence). In one embodiment, the pre-parser 2110 includes a feature extraction and analysis portion 2112, which is operable to determine attributes of frames of the video clip 230. Such attributes may include, but are not limited to, color histograms, gray histograms, brightness, contrast, and the number of motion vectors in a given frame. In one embodiment, only i-frames (e.g., in the case of MPEG videos) of video clip 230 are used. By extracting the attributes of the frames of the video clip 230, a series of attributes are therefore obtained, together with their timestamps. In one embodiment, the pre-parser 2110 also includes a system parameter tuning portion 2114, into which the attributes are input. The system parameters tuning portion 2114 calculates, with respect to a particular frame, an attribute delta between that frame and the frame prior to and after it.

The stable program detector 2100 also includes a candidate detector 2120, which is operable to determine the candidate segments from among the stable segments. In one embodiment, the candidate detector 2120 includes a attribute delta cut and segment forming portion 2122. The attribute delta and segment forming portion 2122 is operable to classify the frames of the video clip 230 into two classes (e.g., stable and non-stable) based on their respective attribute deltas. In one embodiment, this is accomplished by comparing the attribute deltas to a threshold value. Moreover, the threshold value may be geography-sensitive. For example, picture quality in one location may generally be poorer than another. Thus, embodiments may be operable to detect and obtain (e.g., via a communication interface such as communication connections 112) geography-based information to be used in determining a threshold value. Once the stable frames have been determined, connecting the stable frames results in a set of stable video segments.

It should be appreciated that some of the stable segments generated by the attribute delta cut and segment forming portion 2122 may be very short. To suppress the effect of these noises, the candidate detector 2120 in one embodiment may include a segment duration cut portion 2124, which is operable to smooth the segment series by removing some segments based on their lengths. In one embodiment, this is achieved by removing segments shorter than a durational threshold ($L_t$).

In one embodiment, the stable segments are then fed into a segment confidence calculation portion 2126. As the name suggests, the segment confidence calculation portion 2126 is operable to calculate confidence measures for the stable segments. This measure indicates the possibility that the corresponding segment is program as opposed to non-program content. The higher the measure is, the greater the possibility that the corresponding segment is a real program segment. It should be appreciated that the confidence measure may be calculated in a number of ways. For example, and not by way of limitation, the segment may be composed of two parts, including an intra confidence portion and inter confidence portion. An intra confidence portion may be calculated using the features within the segment, while and inter confidence portion may be calculated using the features of the neighbor's segments. The following equations illustrate in greater detail such calculations, using color histogram as an example attribute. It should be appreciated that other manners of calculating confidence measures are possible.

$$C_{intra}^i = con_1 \cdot \frac{L_i - L_t}{L_{Max}} + con_2 \cdot \frac{\overline{HDif_i}}{HDif_t} \quad (1)$$

$$\overline{HDif_i} = \frac{\sum_{j=1}^{L_i} HDif_{ij}}{L_i} \quad (2)$$

$$C_{inter}^i = con_3 \cdot \left(\left(1 - \frac{Lpre\_c_i + Lpost\_c_i}{2 \cdot Lc_{Max}}\right) + \left(\frac{Lpre\_p_i + Lpost\_p_i}{2 \cdot Lneighbor_1}\right)\right) + \quad (3)$$

$$con_4 \cdot \frac{\overline{HDifpre_i} + \overline{HDifpost_i}}{2 \cdot HDif_t}$$

$$\overline{HDifpre_i} = \frac{\sum_{j=Si-Lneighbor_2}^{Si-1} HDif_{ij}}{Lneighbor_2} \quad (4)$$

$$\overline{HDifpost_i} = \frac{\sum_{j=Ei+1}^{Ei+Lneighbor_2} HDif_{ij}}{Lneighbor_2} \quad (5)$$

In Equations 1 and 3, $con_1$, $con_2$, $con_3$, and $con_4$ represent four weight parameters, which can be optimized by searching the parameter space. In Equation 1, $L_i$ represents the length of the $i^{th}$ stable segment. $L_t$ represents the durational threshold used by the segment duration threshold cut portion 2124 above. $L_{max}$ is the maximum length of all stable segments. $\overline{HDif_i}$ indicates the average histogram difference in $L_i$. $HDif_t$ is the histo-difference threshold used by the attribute delta cut and segment forming portion 2122.

In Equation 3, $Lpre\_c_i$ stands for the length of the non-stable segments prior to the $i^{th}$ stable segment, while $Lpost\_c_i$ stands for the length of the non-stable segments after it. $Lc_{max}$, is the maximum length of all non-stable segments. Accordingly, $Lpre\_p_i$ the length of stable segments prior to the $i^{th}$ stable segment in a region with a length of $Lneighbor_1$, and $Lpost\_p_i$ is the length of stable segments after it within a region with the same length, $Lneighbor_1$.

Equations 4 and 5 illustrate one manner of calculating the average histogram difference in a region with length of $Lneighbor_2$ prior to and following the $i^{th}$ stable segment. In Equation 4, $S_i$ is the start point of the segment, and in Equation 5, $E_i$ is the endpoint.

After the calculation of confidence measures, the program candidates are assigned confidence factors. In one embodiment, the candidate detector 2120 includes a segment confidence threshold cutting portion 2128, which is operable to determine one or more candidate segments from the stable segments based on the confidence factors determined above and a confidence threshold. In other words, only stable segments with a confidence factor higher than the confidence threshold are selected as the candidate (i.e., program) segments. Stable segments with confidence factors lower than this threshold are taken as non-program segments. In one embodiment, the confidence threshold is determined by a K-Mean method. The resulting output of the segment confidence threshold cutting portion 2128, and thus the candidate detector 2120, is one or more candidate segments that are determined to be program content to a degree of certainty.

These candidate segments are then passed to the thumbnail selector 2200, which selects the smart thumbnail 260 from the frames of the candidate segments. It should be appreciated that several different strategies of thumbnail selection may be used by the thumbnail selector 2200. Moreover, in one embodiment, the strategy employed may be selected manually via a user interface 250. Example strategies for thumbnail selection will now be described. Such examples are for purposes of illustration and not for limitation.

In one embodiment, the thumbnail selector 2200 selects the most stable frame in the highest confidence candidate segment. The stableness of a frame may be represented by its histogram delta. The smaller the histogram delta the more stable the frame is. It follows that the highest confidence candidate segment is the candidate segment that has the highest confidence factor. Thus, the smart thumbnail 260 would comprise the frame with the smallest histogram delta from the candidate segment with the highest confidence factor.

In another embodiment, the thumbnail selector 2200 selects the highest contrast frame in the highest confidence segment. The contrast of frame may be measured by its color entropy (where the distribution is the normalized color histogram). The higher the entropy of a frame, the larger the contrast. Thus, the smart thumbnail 260 would comprise the frame with the highest entropy from the candidate segment with the highest confidence factor.

In another embodiment, the thumbnail selector 2200 selects a frame with a character face in the highest confidence segment. Frames with character faces are more likely to be manually selected to be a representative thumbnail of a video by users, since frames with character faces have more information than other frames. Therefore, these frames are thought to be more representative. In this strategy, the frame with the highest face measure, which is the ratio between the area of detected face and the frame size, in the candidate segment having the highest confidence factor, is selected as the smart thumbnail 260.

In another embodiment, the thumbnail selector 2200 selects the highest-quality frame in the highest confidence segment. The compound quality of a frame may be measured by its brightness, entropy (contrast), histogram delta (stableness), and face measure, for example. The brightness of a frame is the average intensity over all pixels in the frame. Accordingly, all frames in the highest-confidence candidate segment are filtered by a brightness threshold, thus ruling out the relatively darker frames. The remaining frames may then be measured by a quality equation, such as:

$$Q_i = \frac{EDR_i + MFace_i}{2} \quad (6)$$

$$EDR_i = \frac{(Entropy_i / HDif_i)}{MAX\{Entropy_j / HDif_j \mid j \in Seg_{max\,conf}\}}.$$

In Equation 6, $Seg_{maxconf}$ represents the frame set in the highest-confidence candidate segment, $EDR_i$ denotes the entropy histogram difference ratio of the $i^{th}$ frame in $Seg_{maxconf}$, and $MFace_i$ is its face measure. Thus, the frame with the highest-quality measure $(Q_i)$ is selected as the smart thumbnail 260.

In another embodiment, the thumbnail selector 2200 selects the highest quality frame in the largest candidate segment cluster. In this strategy, the candidate segments may be clustered first by their color histogram difference. The thumbnail selector 2200 may then select the frame with the highest-quality (Equation 6) from the largest segment cluster as the smart thumbnail 260 any clustering algorithms, such as K-Mean, can be adopted here.

In one embodiment, the smart thumbnail 260 is user-selected from the candidate segments. For example, the candidate segments may be provided on a display. The display may be a television, a computer monitor, or the like. Next, an indication of a selected frame may be received, for example, via user interface 250. Due to higher frame rates, the frame selected by a user may not be the best quality frame as compared to neighboring frames. For example, a particular item in the picture may be blurred. Thus, the qualities of the selected frame and a number of neighboring frames may be analyzed. Then, the highest quality of the analyzed frames may be selected as the representative thumbnail.

In one embodiment, once the smart thumbnail 260 has been determined, system 2000 is operable to store the smart thumbnail 260, along with any relevant metadata, back into the video clip 230. This allows for the smart thumbnail 260 to be portable. For example, the video clip 230 could thereafter be transferred to a second device. The second device may then reuse the smart thumbnail 260 as determined by system 2000 without doing any analysis of its own.

In one embodiment, the system 2000 includes a preliminary thumbnail selector 2800 for selecting a preliminary thumbnail 240. This may be of particular use, for example, when a video clip just starts recording and there currently is not a reasonable amount of data to choose the smart thumbnail 260. The preliminary thumbnail selector should be cognizant of any time padding associated with the recording of the video clip. For example, a particular program may begin at 9:00, but a user may direct a PVR to actually begin recording at 8:58. If the preliminary thumbnail 240 were to be selected from the period between 8:58 and 9:00, the preliminary thumbnail 240 would likely be nonrepresentative in that it is likely to be either a commercial or the concluding portions of a prior program. Thus, the preliminary thumbnail selector 2800 knows (e.g., based on information retrieved from an electronic programming guide) that it must first seek to a frame corresponding to a known start time (i.e., 9:00) of the recorded program. In one embodiment, the known start time may be genre specific. For example, even though football telecast may be scheduled to start at 12:00, a preliminary portion of the telecast may be pre-game commentary, and therefore the actual game may not start until some time later. The known start time may also be based on geographic locale. The preliminary thumbnail selector 2800 may then measure the quality of that frame and check it against a quality threshold. For example, the color histogram of the frame may be checked to make sure that it is not a black frame. If the frame meets the quality threshold, then it is selected as the preliminary thumbnail 240. If not, then the next frame is analyzed and so on until one is found that meets the quality threshold.

EXAMPLE METHODS OF OPERATION

The following discussion sets forth in detail the operation of present technology for selection of a thumbnail from a video clip. With reference to FIGS. 3-7, flowcharts 300, 400 500, 600, and 700 each illustrate example steps used by various embodiments of the present technology selection of a thumbnail from a video clip. Flowcharts 300, 400, 500, 600, and 700 include processes that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. Although specific steps are disclosed in flowcharts 300, 400, 500, 600, and 700, such steps are examples. That is, embodiments are well suited to performing various other steps or variations of the steps recited in flowcharts 300, 400, 500, 600, and 700. It is appreciated that the steps in flowcharts 300, 400, 500, 600, and 700 may be performed in an order different than presented, and that not all of the steps in flowcharts 300, 400, 500, 600, and 700 may be performed.

Figure 3:
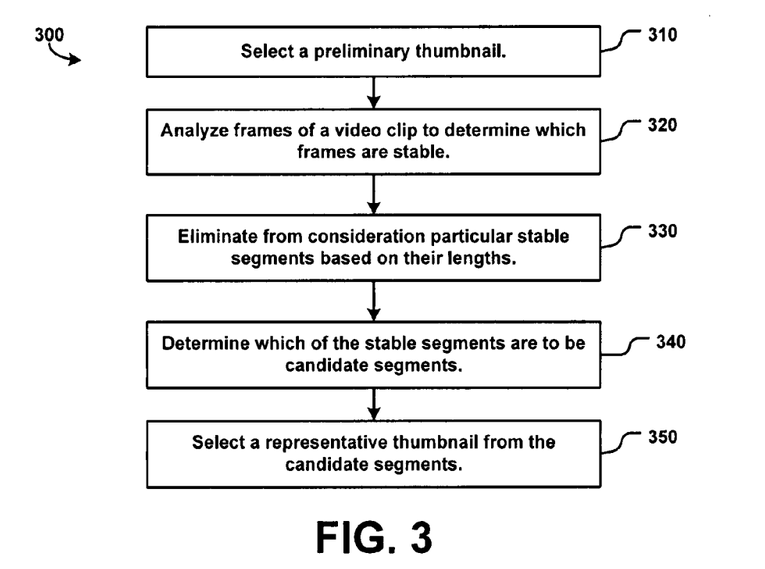
FIG. 3 illustrates a flowchart for a process for selecting a representative thumbnail from a video clip, in accordance with various embodiments.
Figure 4:
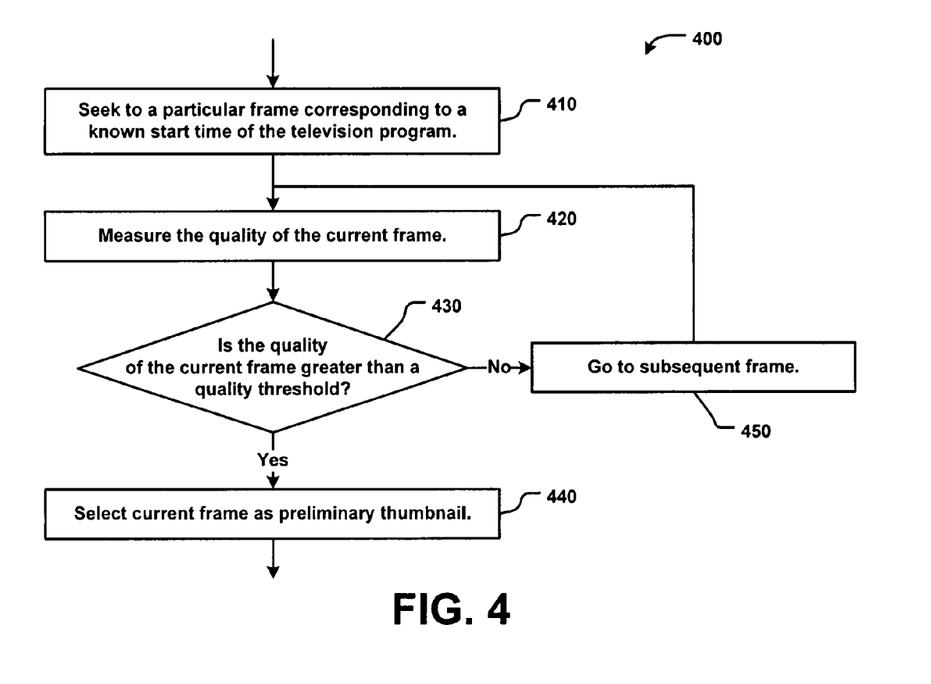
FIG. 4 illustrates a flowchart for selecting a preliminary thumbnail, in accordance with an embodiment.

FIG. 3 illustrates a flowchart 300 for a process for selecting a representative thumbnail from a video clip, in accordance with various embodiments. At block 310, a preliminary thumbnail is optionally selected. It should be appreciated that the selection may be achieved in a number of ways. FIG. 4 illustrates a flowchart 400 of an example method for selecting a preliminary thumbnail, in accordance with an embodiment. Block 410 of flowchart 400 involves seeking to a particular frame corresponding to a known start time of the television program associated with the video clip. This is primarily to account for any record-time padding, as described above. At block 420, the quality of the current frame (initially the frame corresponding to the start time of the television program) is measured. The quality measurement may take into account such things as the frames luminance, entropy, and the like. To save time and computation, the frame's gray histogram may be used. At block 430, a determination is made as to whether the quality of the current frame is greater than a quality threshold. If yes, then the current frame is used as the preliminary thumbnail (block 440). If not, then the following frame is examined (block 450), and so on until a suitable preliminary thumbnail is found.

Figure 5:
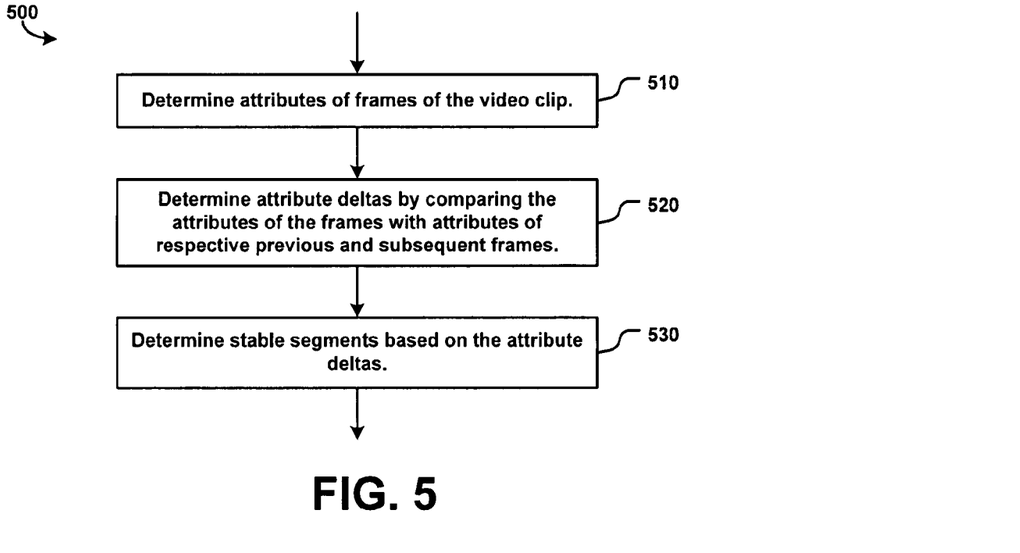
FIG. 5 illustrates a flowchart for a process for analyzing frames of a video clip to determine which frames are stable, in accordance with an embodiment.
Figure 6:
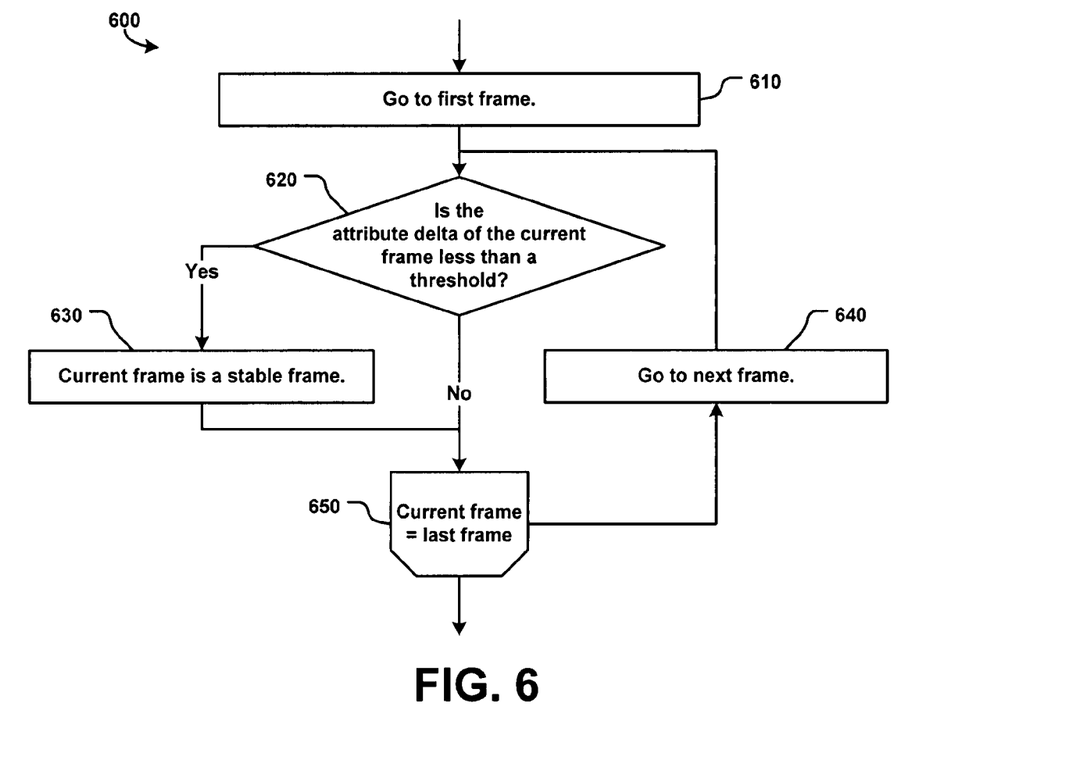
FIG. 6 illustrates a flowchart for determining stable segments based on a threshold value.

With reference again to FIG. 3, block 320 involves analyzing frames of the video clip to determine which frames are stable. As described above, a stable frame is a frame that exhibits a low degree of movement and/or change with respect to the preceding and following frames. The resulting stable frames make up a plurality of stable segments (i.e., one or more stable frames in sequence). It should be appreciated that this analysis may be achieved a number of ways. FIG. 5 illustrates a flowchart 500 of an example process for analyzing frames of a video clip to determine which frames are stable, in accordance with an embodiment. At block 510, attributes are determined for frames of the video clip. Such attributes may include, but are not limited to, color histograms, gray histograms, brightness, contrast, and the number of motion vectors in a given frame. Block 520 next involves determining attribute deltas by comparing the attributes of the frames with attributes of respective previous and subsequent frames. Next, in one embodiment, candidate segments are determined from the stable segments based on the attribute deltas (block 530). It should be appreciated that this may be achieved in a number of ways. For example, the attribute deltas may be compared to a threshold value. FIG. 6 illustrates a flowchart 600 for determining stable segments based on a threshold value. At block 610, the first frame is loaded and is then analyzed to determine whether the attribute delta of that frame is less than a threshold (block 620). If yes, that frame is flagged as a stable frame (block 630). If not, that frame is considered to be a non-stable frame. Subsequent frames (block 640) are analyzed in a similar fashion until all have been completed (denoted by loop limit 650). Thereafter, by connecting the stable frames, the result is a set of stable video segments.

Figure 7:
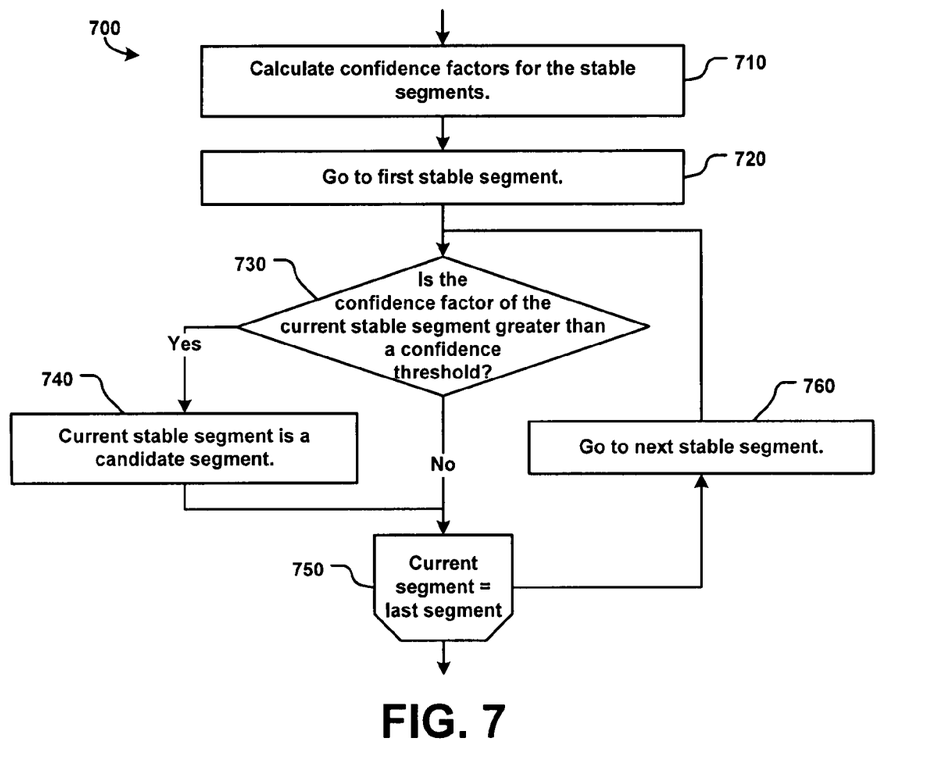
FIG. 7 illustrates a flowchart for determining which of the stable segments are to be candidate segments, in accordance with various embodiments.

With reference again to FIG. 3, block 330 involves eliminating from consideration particular stable segments based on their lengths, in accordance with one embodiment. This may be accomplished, for example, by comparing the stable segments with a durational threshold. The removal of these short segment noises effectively smoothes out the series. At block 340, a determination is made as to which of the stable segments are to be considered candidate segments. It should be appreciated that this determination may be achieved a number of ways. FIG. 7 illustrates a flowchart 700 of an example method for determining which of the stable segments are to be candidate segments, in accordance with various embodiments. At block 710, confidence factors are calculated for the stable segments. This may involve first calculating confidence measures, as illustrated in Equations 1-5. The higher the measure is, the greater the possibility that the corresponding segment is a real program segment as opposed to a non-program segment. After the calculation of confidence measures, the stable segments are assigned confidence factors based on the confidence measures. Once the confidence factors have been determined, the first stable segment is analyzed (block 720) this is to determine whether the confidence factor of that stable segment is greater than a confidence threshold. If yes, then that stable segment is flagged as a candidate segment (block 740). If not, then that stable segment will be considered a non-program segment. Subsequent stable segments (block 760) are analyzed in a similar fashion until all have been completed (denoted by loop limit 750).

With reference again to FIG. 3, block 350 involves selecting a representative thumbnail from the candidate segments determined in block 340. It should be appreciated this may be achieved in a number of ways. In one embodiment, the selection of the smart thumbnail is based on a strategy and/or rule. The strategy/rule may be manually selected by a user from a plurality of options, for example. Initially, one strategy may be preferred over the others as a default strategy. The strategies may include, but are not limited to: selecting the most stable frame in the highest confidence segment; selecting the highest contrast frame in the highest confidence segment; selecting a frame with a character face in the highest confidence segment; selecting the highest-quality frame in the highest confidence segment; and selecting the highest quality frame in the largest segment cluster. Detailed descriptions of these strategies have been provided above and need not be repeated here.

Figure 8:
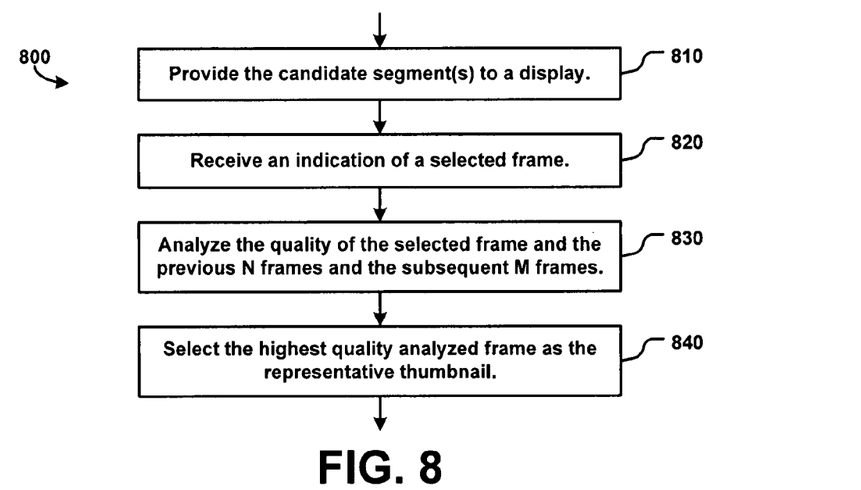
FIG. 8 illustrates a flowchart for selecting a representative thumbnail from the candidate segments, in accordance with an embodiment.

In one embodiment, the smart thumbnail is user-selected from the candidate segments. For example, FIG. 8 illustrates a flowchart 800 of an example method for selecting a representative thumbnail from the candidate segments, in accordance with an embodiment. At block 810, the candidate segments are provided on a display. The display may be a television, a computer monitor, or the like. Next, block 820 involves receiving an indication of a selected frame. The selection may be made via a user interface, for example. Due to higher frame rates, the frame selected by the user may not be the best quality frame as compared to neighboring frames. For example, a particular item in the picture may be blurred. Thus, at block 830, the qualities of the selected frame and a number of neighboring frames are analyzed. Then, at block 840, the highest quality of the analyzed frames is selected as the representative thumbnail.

Thus, embodiments allow for a smart video thumbnail to be selected from a video or a video clip to represent the corresponding video. Embodiments provide technology to help ensure that the selected thumbnail is program content, good visual quality, and highly representative of the video.

This greatly enhances the user experience relative to conventional PVRs. As result of the present technology, a visual cue is provided to aid the user in identifying a recorder program with greater certainty. In addition to selecting a single thumbnail that is representative of an entire program, the technology thus described may also be used to select multiple thumbnails, where each is representative of individual sections, scenes, chapters, etc., of a program.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for selecting a thumbnail from a video clip, the method comprising:
   analyzing, by a computing device, a plurality of frames of said video clip to determine a measure of visual quality for each frame of said plurality of frames, wherein said measure of visual quality for a frame is based on a degree of change with respect to a frame preceding said frame in said plurality of frames and a frame following said frame in said plurality of frames;
   classifying, by the computing device, each frame of said plurality of frames as stable or non-stable based on said measure of visual quality for each frame, wherein frames exhibiting a degree of change lower than a threshold value are classified as stable frames of said video clip;
   composing, by the computing device, stable segments of said video clip from said stable frames;
   determining, by the computing device for each stable segment a degree of confidence that the stable segment is a program segment as opposed to a non-program segment;
   selecting, by the computing device, one or more candidate segments from stable segments of said video clip that are determined to a degree of certainty to be program segments; and
   selecting, by the computing device, a representative thumbnail of said video clip from among said candidate segments.

2. The method as recited in claim 1 further comprising:
   calculating, by the computing device, a confidence factor for each stable segment representing the degree of confidence that the stable segment is a program segment; and
   selecting, by the computing device, said representative thumbnail of said video clip as one of:
      the most stable frame in the candidate segment having the highest confidence factor,
      the highest contrast frame in the candidate segment having the highest confidence factor,
      a particular frame that includes one or more character faces in the candidate segment having the highest confidence factor,
      the highest quality frame in the candidate segment having the highest confidence factor, and
      the highest quality frame in a candidate segment cluster.

3. The method as recited in claim 1 further comprising:
   providing, by the computing device, said one or more candidate segments to a display device; and
   receiving, by the computing device, an indication of a user-selected frame in one of said candidate segments.

4. The method as recited in claim 3 further comprising:
   analyzing, by the computing device, qualities of said user-selected frame and one or more neighboring frames of said user-selected frame to determine a highest-quality frame of said user-selected frame and said neighboring frames; and
   selecting, by the computing device, said representative thumbnail of said video clip as said highest-quality frame.

5. The method as recited in claim 1 wherein:
   analyzing frames of said video clip to determine a measure of visual quality for each frame of said plurality of frames comprises:
      calculating, by the computing device, a histogram for each frame of said plurality of frames, and
      determining, by the computing device, a histo-difference for each frame of said plurality of frames by comparing a histogram for a particular frame with a histogram for a frame preceding said particular frame in said plurality of frames and a histogram for a frame following said particular frame in said plurality of frames; and
   wherein frames having histo-differences lower than a histo-difference threshold are classified as stable frames.

6. The method as recited in claim 1 further comprising:
   calculating, by the computing device, a confidence factor for each stable segment representing the degree of confidence that the stable segment is a program segment; and
   determining, by the computing device, stable segments with confidence factors above a confidence threshold representing said degree of certainty.

7. The method as recited in claim 1 further comprising:
   eliminating, by the computing device, one or more stable segments from consideration when said one or more stable segments have respective durations shorter than a durational threshold.

8. A method for selecting a thumbnail from a video clip, the method comprising:
   extracting, by a computing device, one or more attributes from each frame of a plurality of frames of said video clip;
   determining, by the computing device, a measure of visual quality for each frame of said plurality of frames, wherein said measure of visual quality for a frame is based on an attribute delta calculated for said frame by comparing said one or more attributes extracted from said frame with said one or more attributes extracted from a frame preceding said frame in said plurality of frames and said one or more attributes extracted from a frame following said frame in said plurality of frames;
   classifying, by the computing device, each frame of said plurality of frames as stable or non-stable based on said measure of visual quality for each frame, wherein frames having attribute deltas lower than a threshold value are classified as stable;
   composing, by the computing device, stable segments from frames classified as stable;
   determining, by the computing device, a set of stable segments of said video clip by eliminating stable segments from consideration based on a durational threshold;
   calculating, by the computing device, a confidence factor for each stable segment of said set of stable segments, each confidence factor representing a degree of confidence that a respective stable segment is a program segment;

selecting, by the computing device, one or more candidate segments from said set of stable segments, said one or more candidate segments having confidence factors above a confidence threshold; and selecting, by the computing device, a representative thumbnail of said video clip from among said candidate segments based at least in part on said confidence factors of said candidate segments.

9. The method as recited in claim 8 wherein said one or more attributes comprise one or more of: a histogram, brightness, contrast, and number of motion vectors in a given frame.

10. The method as recited in claim 8 further comprising:
eliminating, by the computing device, particular frames from consideration based on a padding time at the beginning or end of said video clip.

11. The method as recited in claim 8 further comprising:
selecting, by the computing device, a preliminary thumbnail prior to extracting said one or more attributes from each frame of said plurality of frames of said video clip.

12. The method as recited in claim 11 further comprising:
seeking, by the computing device, to a particular frame corresponding to a known start time of a television program; and
selecting, by the computing device, said preliminary thumbnail based on said particular frame.

13. The method as recited in claim 12 wherein said known start time is genre specific.

14. The method as recited in claim 12 wherein selecting said preliminary thumbnail based on said particular frame comprises:
measuring, by the computing device, quality of said particular frame based on luminance and entropy of said particular frame;
selecting, by the computing device, said particular frame as said preliminary thumbnail provided the quality of said particular frame is greater than a quality threshold; and
selecting, by the computing device, a subsequent frame as said preliminary thumbnail provided the quality of said particular frame is lower than said quality threshold and quality of said subsequent frame is greater than said quality threshold.

15. A system for selecting a thumbnail from a recorded video clip, the system comprising:
a processor for executing computer-executable instructions; and
memory storing computer-executable instructions for implementing:
a stable program detector for determining one or more candidate segments from said video clip, said stable program detector comprising:
a pre-parser for analyzing a plurality of frames of said video clip to determine a measure of visual quality for each frame of said plurality of frames and for classifying each frame of said plurality of frames as stable or non-stable based on said measure of visual quality for each frame, wherein said measure of visual quality for a frame is based on a degree of change with respect to a frame preceding said frame in said plurality of frames and a frame following said frame in said plurality of frames, and wherein frames exhibiting a degree of change lower than a threshold value are classified as stable frames of said video clip; and
a candidate detector for composing stable segments of said video clip from said stable frames, determining for each stable segment a degree of confidence that the stable segment is a program segment as opposed to a non-program segment, and selecting said one or more candidate segments from stable segments of said video clip that are determined to a degree of certainty to be program segments; and
a thumbnail selector for selecting a representative thumbnail of said video clip from among said candidate segments.

16. The system as recited in claim 15, wherein said pre-parser comprises:
a feature extraction and analysis portion operable to calculate a histogram for each frame of said plurality of frames; and
a system parameter tuning portion operable to calculate a histo-difference for each frame of said plurality of frames by comparing a histogram for a particular frame with a histogram for a frame preceding said particular frame in said plurality of frames and a histogram of a frame following said particular frame in said plurality of frames.

17. The system as recited in claim 15, wherein said candidate detector comprises:
a segment confidence calculation portion operable to calculate a confidence factor for each stable segment representing the degree of confidence that the stable segment is a program segment; and
a segment confidence threshold cutting portion operable to determine stable segments with confidence factors above a confidence threshold representing said degree of certainty.

18. The system as recited in claim 17, wherein said candidate detector further comprises:
a segment duration threshold cutting portion operable to remove stable segments that are shorter in duration than a durational threshold.

19. The system as recited in claim 15, wherein said thumbnail selector is operable to:
select said thumbnail based on a rule; and
present a user-interface enabling a user to select said rule from a plurality of offerings.

20. The system as recited in claim 15, wherein said system is a digital video recorder.

21. The method as recited in claim 5 wherein:
the degree of confidence that a particular stable segment is a program segment is based on an intra confidence factor and an inter confidence factor,
the intra confidence factor is calculated using an average histo-difference within said particular stable segment, and
the inter confidence factor is calculated using an average histo-difference within a neighboring stable segment prior to said particular stable segment and an average histo-difference within a neighboring stable segment following said particular stable segment.

* * * * *